(12) United States Patent
Hofmann

(10) Patent No.: US 11,852,557 B2
(45) Date of Patent: Dec. 26, 2023

(54) DEVICE AND METHOD FOR MEASURING TORQUE IN AN ACTUATING DRIVE

(71) Applicant: AUMA Riester GmbH & Co. KG, Mullheim (DE)

(72) Inventor: Benjamin Hofmann, Heitersheim (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 410 days.

(21) Appl. No.: 17/117,384

(22) Filed: Dec. 10, 2020

(65) Prior Publication Data

US 2021/0181046 A1 Jun. 17, 2021

(30) Foreign Application Priority Data

Dec. 13, 2019 (DE) .......................... 102019134361.5

(51) Int. Cl.
*G01L 3/14* (2006.01)
*G01L 5/00* (2006.01)

(52) U.S. Cl.
CPC .......... *G01L 3/1435* (2013.01); *G01L 3/1407* (2013.01); *G01L 3/1428* (2013.01); *G01L 3/1471* (2013.01); *G01L 5/0061* (2013.01)

(58) Field of Classification Search
CPC ... G01L 3/1435; G01L 3/1471; G01L 3/1428; G01L 3/1407; G01L 5/0061
See application file for complete search history.

(56) References Cited

U.S. PATENT DOCUMENTS

| | | | |
|---|---|---|---|
| 4,785,675 A | 11/1988 | Takasu et al. | |
| 4,853,629 A | 8/1989 | Rops | |
| 6,868,743 B2 | 3/2005 | Nakane et al. | |
| 9,897,499 B2 | 2/2018 | Liang et al. | |
| 10,258,504 B1 | 5/2019 | Nu et al. | |
| 2013/0238257 A1 | 9/2013 | Rajamani et al. | |
| 2016/0107720 A1 | 4/2016 | Xu | |
| 2017/0097269 A1 | 4/2017 | Liang et al. | |
| 2017/0184466 A1 | 6/2017 | Liang et al. | |
| 2020/0063793 A1 | 2/2020 | Rossberger | |
| 2020/0292400 A1* | 9/2020 | Shibuya | G01L 3/1435 |

FOREIGN PATENT DOCUMENTS

| | | |
|---|---|---|
| CN | 105043615 | 11/2015 |
| CN | 106574876 | 4/2017 |
| DE | 202004003978 | 6/2004 |
| DE | 10362129 | 8/2013 |
| DE | 102012217224 | 2/2014 |
| DE | 102016123293 | 6/2017 |
| DE | 102016122845 | 5/2018 |
| DE | 102017126906 | 5/2018 |
| EP | 0831021 | 3/1998 |
| EP | 3012181 | 4/2016 |
| JP | 2019056680 | 4/2019 |

* cited by examiner

*Primary Examiner* — Paul M. West
(74) *Attorney, Agent, or Firm* — Volpe Koenig

(57) ABSTRACT

A method and a device (1) are provided for determining a torque of a transmission, in particular of an actuating drive (14), in which an elastically deformable bending element (4) that deforms as a function of the torque is arranged in a transmission path of the torque, and a sensor unit (8) with which deformation of the bending element can be detected forms a structural unit which can be mounted as a whole.

19 Claims, 2 Drawing Sheets

DEVICE AND METHOD FOR MEASURING TORQUE IN AN ACTUATING DRIVE

INCORPORATION BY REFERENCE

The following documents are incorporated herein by reference as if fully set forth: German Patent Application No. 10 2019 134 361.5, filed Dec. 13, 2019.

TECHNICAL FIELD

The invention relates to a method and to a device for determining a torque of a transmission, in particular at an actuating drive, where an elastically deformable bending element which deforms as a function of the torque is arranged in a transmission path of the torque.

BACKGROUND

Actuating drives are used, for example, to actuate fittings or valves. In this context, a high torque may be necessary. On the other hand, an excessive torque can damage the fitting and/or the actuating drive. It is therefore desirable to measure the torque at any time during operation, in order to be able to react quickly to possibly occurring torque peaks or overloads.

The object according to the invention is achieved by a method and devices having one or more of the features disclosed herein.

The method according to the invention is distinguished in that a degree of deformation is detected by a distance measurement with a Hall sensor. The advantage here is that the distance measurement is carried out in a contactless fashion and Hall sensors are cost-effective and easy to mount.

In particular, in this context the degree of deformation can be detected by determining a relative position of the Hall sensor with respect to a magnetically active corresponding element. The magnetically active corresponding element is preferably a permanent magnet.

An alternative method in which the bending element has a planar extent is preferably distinguished in that a degree of deformation is detected in the direction of the planar extent.

The advantage here is that deformation transversely with respect to the planar extent is decoupled from the measurement and, for example, in this way can be used to compensate axial mounting tolerances.

In one embodiment, the bending element is embodied as a tongue in a plate-shaped carrier.

In one expedient embodiment, a first transmission stage is attached to the carrier, and a second transmission stage is attached to the bending element. In this way, the bending element is deflected by a torque between the two transmission stages. The deflection can be determined by means of the Hall sensor, from which the torque can be obtained by back calculation.

The invention comprises a device for determining a torque of a transmission, in particular of an activating drive, wherein an elastically deformable bending element which deforms as a function of the torque is arranged in a transmission path of the torque, and wherein a sensor arrangement with which deformation of the bending element can be detected forms a structural unit which can be mounted as a whole. This makes simple and cost-effective mounting of the sensor arrangement possible.

In one embodiment, the sensor arrangement has a sensor and a corresponding element, and the sensor senses, preferably in a contactless fashion, a relative position of the sensor and corresponding element in order to sense a degree of deformation of the bending element.

In one advantageous embodiment, the device has at least two bending elements which can be deflected essentially tangentially with respect to a rotational direction of the transmission, wherein a fixed part of the transmission can be attached to the bending elements, and the device has a sensor unit which is to designed to determine a deflection of at least one of the bending elements.

The bending element is expediently embodied in such a way that it deforms elastically. Depending on the material and depending on the torques which occur, it can therefore be advantageous if the bending elements are clamped on one side or on two sides. In this way, the necessary bending force can be influenced through the arrangement of the bending elements.

In one embodiment, the device has a base with an, in particular circular, cutout for a transmission shaft, wherein the bending elements are arranged distributed uniformly around the cutout. Such an arrangement is expedient, in particular, for the use of planetary gear mechanisms, since in this context the output shaft and/or drive shaft are arranged coaxially with respect to the housing/ring gear.

In one advantageous embodiment, the device has a base plate. The bending elements are preferably embodied as tongues in the plane of the plate of the base plate and the deflection of the bending elements occurs in the plane of the plate. This has the advantage that the deflection is independent of axial deflection of the bending elements, and the bending elements can, under certain circumstances, be used for axial tolerance compensation.

The determination of the deflection can preferably be based on a capacitive, optical, resistive, piezoresistive, piezoelectric or magnetic effect. The distance measurement can therefore be carried out, for example, by means of strain gauges or Hall sensors.

In one advantageous embodiment, the device has a processor-based device for calculating a torque from the deflection. In this way, a value which is proportional to a torque can be output directly.

Alternatively and/or additionally, the device can be connectable to a device for calculating a torque from the deflection. Therefore, the measured value can also be used in other ways, for example for open-loop and closed-loop control purposes or also for issuing alarms for other system components.

A particularly advantageous device according to the invention has at least two bending elements which can be deflected essentially tangentially with respect to a rotational direction of the transmission, wherein a fixed part of the transmission can be attached to the bending elements, and wherein the device has a sensor unit which is designed to determine a deflection of a bending element. The sensor unit has a first sensor element and a second sensor element, wherein the first sensor element is connected to a bending element, and the second sensor element is connected to a fixed component, and wherein the sensor unit is designed to determine the distance between the first sensor element and the second sensor element. In this way, a torque of the transmission acts on the bending elements, so that they are deflected essentially tangentially with respect to the rotational direction.

The torque can be calculated directly using the deflection. The advantage is that the deflection can be determined by simple distance measurement between the bending element and the fixed component.

In one advantageous embodiment, one sensor element has a permanent magnet, and the other sensor element has a Hall sensor. The distance from the permanent magnet can be easily determined by means of the Hall sensor. The distance measurement with a Hall sensor is tolerant with respect to axial displacements between the Hall sensor and the permanent magnet. As a result, axial deflection of the bending elements can be used to compensate axial position tolerances or fabrication tolerances without measurement of the torque being influenced thereby.

In one advantageous embodiment, the first sensor element has the permanent magnet, and the second sensor element has the Hall sensor. In this way, the Hall sensor is arranged on the fixed part, as a result of which the cabling can be simplified.

In one particularly advantageous embodiment, the two sensor elements are connected to one another by a spring element and/or are guided in a linearly displaceable fashion one in the other, so that they form one sensor unit. The advantage here is that the mounting is simplified, since orientation of the two sensor elements with respect to one another can be eliminated. As a result, it can be ensured that there is no mounting-induced deviation of the measured values.

In one advantageous embodiment, the two sensor elements are embodied in one piece. In this context, one spring element or the spring element can in particular also be embodied in one piece. As a result, a sensor unit is formed which is easy to handle and mount.

The invention also comprises a sensor unit for determining the distance between a first component and a second component which can move relative to one another. The sensor unit is distinguished in that the sensor unit has a first sensor element and a second sensor element, wherein the first sensor element can be connected to the first component, and the second sensor element can be connected to the second component, and in that the first sensor element has a permanent magnet, and the second sensor element has a Hall sensor. Such a sensor unit can be manufactured easily and cost-effectively and is easy to mount. Moreover, it makes possible a precise arrangement of the two sensor elements with respect to one another and in relation to an installation location, so that the measurement results which can be obtained by this are accurate and reproducible.

In one embodiment, the two sensor elements are expediently connected to one another by means of a spring element, and/or the two sensor elements are guided in a linearly displaceable fashion one in the other, so that they form one sensor unit.

In particular it is advantageous if the two sensor elements are embodied in one piece. In this way, the two sensor elements are secured in position with respect to one another, so that mounting with a defined arrangement is possible. As a result, the measurement results become more accurate and repeatable.

In one embodiment, the Hall sensor is embodied as an integrated Hall sensor which supplies an output voltage which is dependent on the distance. As a result, the measurement result can be processed in a simple evaluation circuit. The output voltage of the Hall sensor can be processed, for example, at an analog input of a microcontroller.

The Hall sensor can alternatively supply a digital signal which is dependent on the distance and which can be processed by a microcontroller via a digital input.

Such Hall sensors are available cost-effectively, for example, as integrated components.

The invention also comprises an actuating drive having a planetary gear mechanism and a device according to the invention for determining the torque, wherein the ring gear of the planetary gear mechanism is connected in a rotationally fixed fashion to the bending elements of the device.

The invention also comprises an actuating drive having a plurality of transmission stages comprised of planetary gear mechanisms, wherein a device according to the invention for determining the torque is arranged between a first planetary gear mechanism and a second planetary gear mechanism, and the first planetary gear mechanism is connected to the bending elements, and the second planetary gear mechanism is connected to a fixed part of the device.

BRIEF DESCRIPTION OF THE DRAWINGS

The invention will be explained in more detail below on the basis of an exemplary embodiment and with reference to the appended drawings, in which.

DETAILED DESCRIPTION

Figure 1:
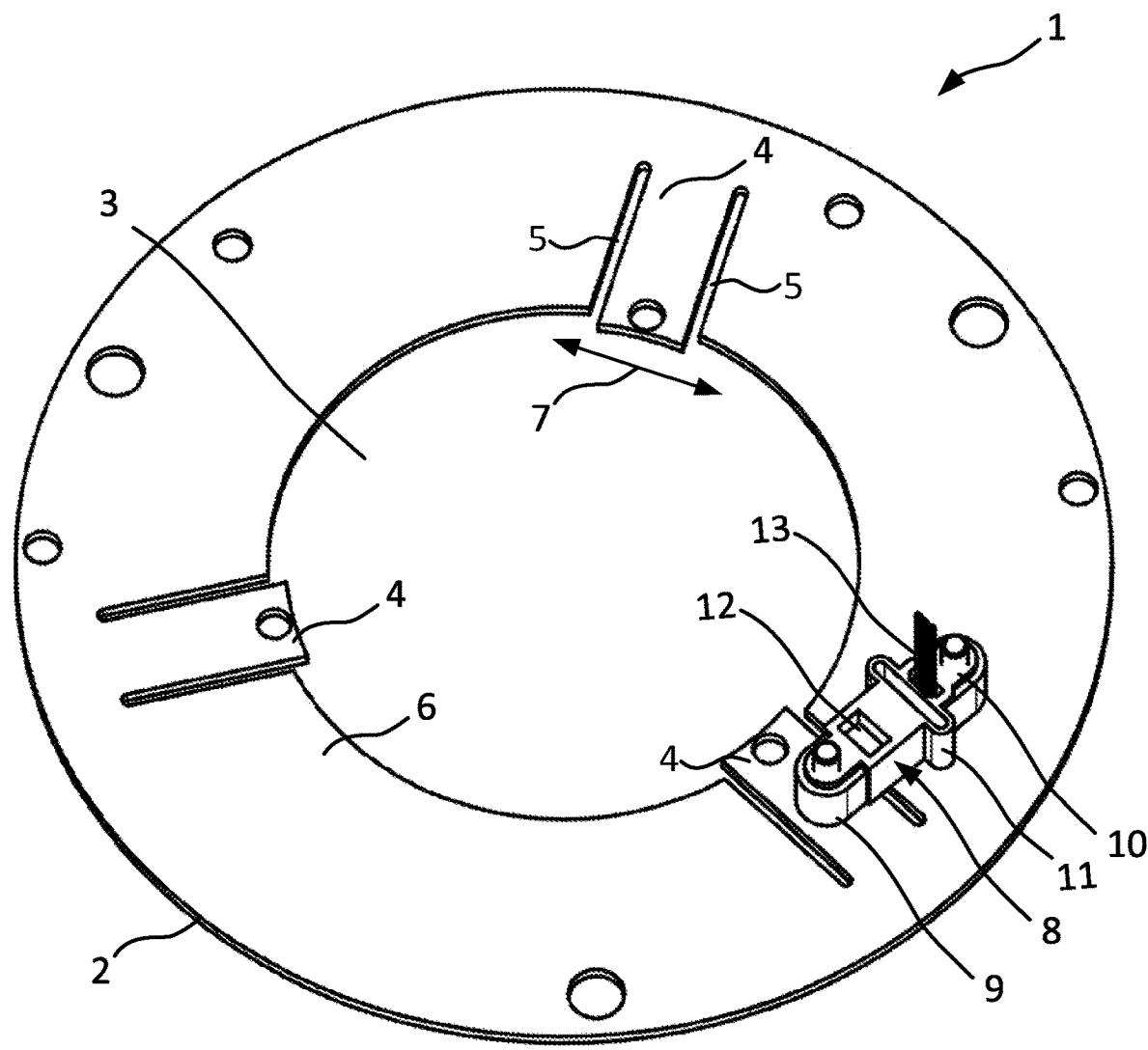
FIG. 1: shows an oblique illustration of a device for determining a torque of a transmission with a sensor unit with a Hall sensor and a permanent magnet.

FIG. 1 shows a device 1 for determining a torque at a transmission, in particular of an actuating drive.

This device 1 has a base plate 2 which is manufactured in the example from a metal plate. The base plate 2 can have, for example, a thickness of 1 mm to 3 mm. In the example, the base plate 2 has a round outer contour. However, this outer contour can be adapted as a function of the shape of the transmission on which the device is used. The outer contour can also have, without limitation of the function, a square or pentagonal, hexagonal or octagonal shape or any other desired shape.

The base plate 2 has an opening 3 which is essentially circular in the example and through which, for example, a shaft of a transmission can be guided.

The base plate 2 has three bending elements in the form of bending tongues 4 in the example. These bending tongues 4 are arranged distributed uniformly on the inner circumference of the opening 3. The bending tongues 4 protrude radially inward into the opening 3 beyond the circumference of the opening 3. The bending tongues 4 are formed here by narrow indents 5 in the base plate 2. There can also be more or fewer bending tongues 4 present, for example four or two. The number of bending tongues 4 can depend on the torque to be measured, on the rigidity of the bending tongues and/or on the material of the bending tongues 4.

A fixed part of a transmission is preferably connected to the bending tongues 4. The fixed part 6 of the base plate 2 can be connected to a fixed part of a housing 21 of an actuating drive 14 or of a further transmission.

During operation, a torque between the transmission and the fixed part 6 brings about a deflection of the bending tongues 4 essentially tangentially with respect to the rotation direction, as is illustrated in the figure by the arrow 7. This means that deflection takes place essentially within the plane of the base plate.

A further advantage of the bending tongues 4 is that they can compensate tolerances, for example of a housing 21, in an axial direction. In this context, deflection of the bending tongues 4 occurs essentially perpendicularly with respect to the plane of the base plate 2. This does not influence the deflection within the plane of the base plate 2 and therefore the measurement of the torque.

The deflection of the bending tongues 4 is determined by a sensor unit 8. This sensor unit 8 has a first sensor element 9 which is connected to a bending tongue 4. A second sensor element 10 is connected to the fixed part 6 of the base plate 2. The two sensor elements 9 and 10 are integrally connected to one another by means of a spring element 11. A restoring torque by means of the spring element 11 is not necessary for the function of the device. However, this has the advantage that the sensor unit 8 can easily be mounted in one piece and as a whole and, for example, no adjustment is necessary. Alternatively, the two sensor elements 9 and 10 can also be mounted individually or embodied in such a way that they can be displaced one in the other.

A permanent magnet 12 is arranged in the first sensor element 9. A Hall sensor 13 is arranged as an integrated circuit in the second sensor element 10. The Hall sensor 13 lies within the magnetic field of the permanent magnet 12. Deflection of the bending tongue 4 within the plane of the base plate 2 causes the distance between the two sensor elements 9 and 10 to change. As a result, the magnetic field in the Hall sensor 13 changes. The deflection can be inferred directly from the Hall voltage which changes as a result.

Figure 2:
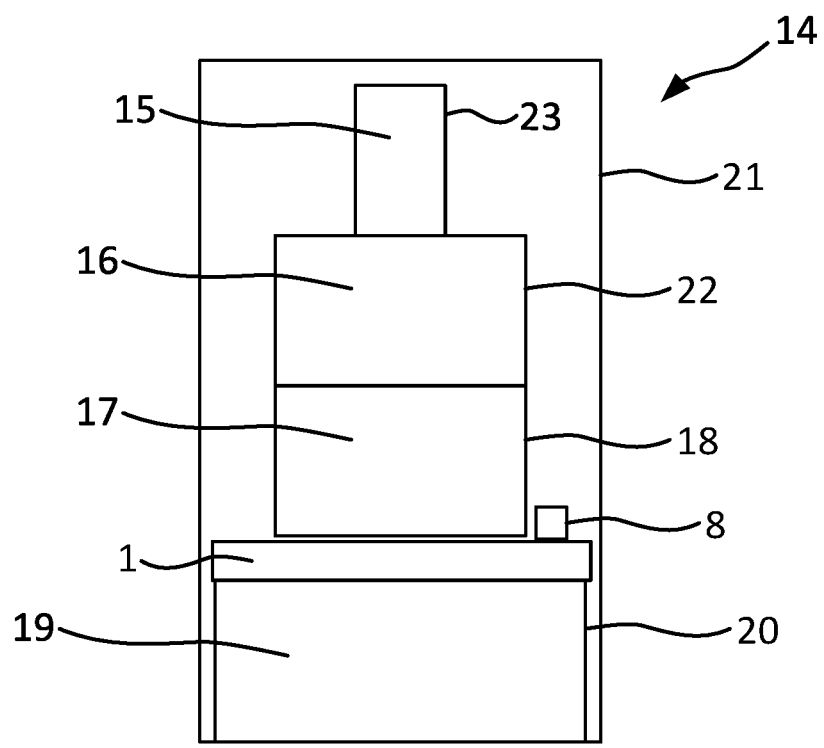
FIG. 2: shows a block illustration of an actuating drive with a device for determining a torque.

FIG. 2 shows a schematic block circuit diagram of an actuating drive 14. The actuating drive 14 has an electric motor 15 as a drive. The shaft of the electric motor 15 is connected to a non-return device 16 which prevents a fitting which is actuated by the actuating drive 14 from being moved by fluid flowing within the fitting. The housing 22 of the non-return device 16 is connected in a rotationally fixed fashion to the housing 23 of the electric motor 15.

The non-return device 16 is connected on the output side to a first planetary gear mechanism 17. In this context, the housing 22 of the non-return device 16 is connected in a rotationally fixed fashion to the ring gear 18 of the first planetary gear mechanism 17.

The ring gear 18 of the first planetary gear mechanism 17 is connected in a rotationally fixed fashion to the bending tongues 4 of a device 1 according to the invention for determining the torque. The device 1 has a sensor unit 8 for determining the deflection of the bending tongues 4. This sensor unit 8 preferably has a permanent magnet and a Hall sensor according to FIG. 1. However, the deflection can also be determined by capacitive, resistive, piezoresistive or optical sensors.

The first planetary gear mechanism 17 is connected to a second planetary gear mechanism 19. The second planetary gear mechanism 19 forms a connection for a fitting or a valve at the output, which connection or fitting is actuated with the actuating drive 14.

The base plate 2 of the device 1 is connected in a rotationally fixed fashion to the ring gear 20 of the second planetary gear mechanism 19. The ring gear 20 is connected in a rotationally fixed fashion at the opposite end to the housing 21 of the actuating drive 14.

It is decisive for the measurement of the torque that all the components which are connected to the bending tongues 4 are connected to one another in a rotationally fixed fashion, but otherwise do not have any connection to the other fixed part. The components which are connected to the base plate are, on the other hand, secured in a rotationally fixed fashion.

If the electric motor 15 is driven, a torque arises between the first planetary gear mechanism 17 and the second planetary gear mechanism 19 in such an arrangement. This torque brings about a deflection of the bending tongues 4 essentially tangentially with respect to the rotational direction of the transmission. This deflection is detected by the sensor unit 8 and can be converted by calculation into a torque.

The detected torque corresponds in the example to the torque at the output of the actuating drive 14, that is to say at a fitting or a valve. As a result, excessive loading of the fitting, of the valve and/or of the actuating drive can be detected and prevented. Furthermore, an end position or some other kind of blockage or a defect in the fitting, the value or the actuating drive can also be ascertained by means of the accurate measurement of the torque, for example.

LIST OF REFERENCE NUMBERS

1 Device for determining a torque
2 Base plate
3 Opening
4 Bending tongue
5 Indents
6 Fixed part
7 Arrow
8 Sensor unit
9 First sensor element
10 Second sensor element
11 Spring element
12 Permanent magnet
13 Hall sensor
14 Actuating drive
15 Electric motor
16 Non-return device
17 First planetary gear mechanism
18 Ring gear of the first planetary gear mechanism
19 Second planetary gear mechanism
20 Ring gear of the second planetary gear mechanism
21 Housing of the actuating drive
22 Housing of the non-return device
23 Housing of the electric motor

The invention claimed is:

1. A method for determining a torque of a transmission for an actuating drive (14), the method comprising:
    arranging an elastically deformable bending element (4), which deforms as a function of the torque, in a transmission path of the torque; and
    detecting a degree of deformation using a distance measurement with a Hall sensor (13);
    wherein the bending element is formed as a tongue in a plate-shaped carrier, and a first transmission stage of the transmission is attached to the carrier and a second transmission stage of the transmission is attached to the bending element.

2. The method as claimed in claim 1, wherein the degree of deformation is detected by determining a relative position of the Hall sensor with respect to a magnetically active corresponding element.

3. The method as claimed in claim 2, wherein the magnetically active corresponding element is a permanent magnet.

4. The method according to claim 1, wherein the bending element has a planar extent, and the degree of deformation is detected in a direction of the planar extent.

5. The method according to claim 1, wherein an axial deflection of the bending element is used to compensate at least one of axial position tolerances or fabrication tolerances.

6. A device (1) for determining a torque of a transmission of an actuating drive (14), the device comprising:

a base plate (2);

an elastically deformable bending element configured to deform as a function of the torque arranged in a transmission path of the torque, wherein the bending element (4) is formed as a tongue in a plane of the base plate (2), and the deflection of the bending element (4) occurs in the plane of the base plate (2); and a sensor unit (8) configured to detect a deformation of the bending element that forms a structural unit with the elastically deformable bending element that can be mounted as a whole.

7. The device (1) as claimed in claim 6, wherein the sensor unit (8) has a sensor (13) and a corresponding element (12), and the sensor (13) senses a relative position of the sensor (13) and corresponding element (12) in order to sense a degree of deformation of the bending element (4).

8. The device (1) as claimed in claim 7, wherein the sensor (13) is a Hall sensor, and the corresponding element is a magnet.

9. A device (1) for determining a torque of a transmission, the device comprising:

at least two elastically deformable bending elements (4) which can be deflected essentially tangentially with respect to a rotational direction of the transmission, the bending elements being adapted to be attached to a fixed part of the transmission;

a sensor unit (8) configured to determine a deflection of at least one of the bending elements (4); and a base plate (2), and the bending elements (4) are formed as tongues in a plane of the plate, and the deflection of the bending elements (4) occurs in the plane of the plate.

10. The device (1) as claimed in claim 9, wherein the bending elements (4) are clamped on at least one side.

11. The device (1) as claimed in claim 9, further comprising a base (2) with a cutout (3) for a transmission shaft, and the bending elements (4) are arranged distributed uniformly around the cutout.

12. The device (1) as claimed in claim 9, wherein the determination of the deflection is based on at least one of a capacitive, optical, resistive, piezoresistive, piezoelectric or magnetic effect.

13. The device (1) as claimed in claim 9, wherein the device (1) includes a device configured to calculate a torque from the deflection or is adapted to be connected to a device for calculating a torque from the deflection.

14. The device (1) as claimed in claim 9, wherein the sensor unit (8) has a first sensor element (9) and a second sensor element (10), the first sensor element (9) is connected to one of the bending elements (4), and the second sensor element (10) is secured in a fixed location, and the sensor unit (8) is configured to determine a distance between the first sensor element (9) and the second sensor element (10).

15. The device as claimed in claim 14, wherein one of the first or the second sensor elements (9) has a permanent magnet (12), and the other of the first or the second sensor elements (10) has a Hall sensor (13).

16. The device as claimed in claim 15, wherein the first and second sensor elements (9, 10) are at least one of connected to one another by a spring element (11) or are guided linearly displaceably one in the other, to form the sensor unit as a single unit.

17. The device as claimed in claim 14, wherein the first and second sensor elements (9, 10) are embodied in one piece.

18. An actuating drive (14) having a planetary gear mechanism (17) and the device (1) for determining the torque as claimed in claim 9, wherein a ring gear (18) of the planetary gear mechanism (17) is connected in a rotationally fixed fashion to the bending elements (4).

19. The actuating drive (14) as claimed in claim 18, further comprising a plurality of transmission stages comprised of at least first and second planetary gear mechanisms, wherein the device (1) for determining the torque is arranged between the first planetary gear mechanism (17) and the second planetary gear mechanism (19), and the first planetary gear mechanism (17) is connected to the bending elements (4), and the second planetary gear mechanism (19) is connected to a fixed part (6) of the device (1).

\* \* \* \* \*